US012032370B2

(12) United States Patent
De Zarraga et al.

(10) Patent No.: US 12,032,370 B2
(45) Date of Patent: Jul. 9, 2024

(54) SUPPORTING AN AIRCRAFT ON A MISSION IN WHICH AN INTENT OF THE AIRCRAFT IS CONVEYED RESPONSIVE TO A LOST-LINK EVENT

(71) Applicant: AURORA FLIGHT SCIENCES CORPORATION, A SUBSIDIARY OF THE BOEING COMPANY, Manassas, VA (US)

(72) Inventors: Gaston De Zarraga, Lexington, MA (US); Robert A. Vivona, Arlington, MA (US)

(73) Assignee: AURORA FLIGHT SCIENCES CORPORATION, A SUBSIDIARY OF THE BOEING COMPANY, Manassas, VA (US)

( * ) Notice: Subject to any disclaimer, the term of this patent is extended or adjusted under 35 U.S.C. 154(b) by 204 days.

(21) Appl. No.: 17/452,154

(22) Filed: Oct. 25, 2021

(65) Prior Publication Data
US 2023/0125312 A1    Apr. 27, 2023

(51) Int. Cl.
*G05D 1/00*      (2024.01)
*B64C 39/02*     (2023.01)
(Continued)

(52) U.S. Cl.
CPC ......... *G05D 1/0022* (2013.01); *B64C 39/024* (2013.01); *G08G 5/0004* (2013.01); *B64U 2101/00* (2023.01); *B64U 2201/10* (2023.01)

(58) Field of Classification Search
CPC ...... G05D 1/106; G05D 1/0088; G05D 1/101; G05D 1/10; G05D 1/1064; G05D 1/0022;
(Continued)

(56) References Cited

U.S. PATENT DOCUMENTS 9,613,536 B1 *  4/2017  Wolford .............. G08G 5/0026
9,847,034 B1 * 12/2017  Plawecki ............ G08G 5/0039
2016/0275801 A1 *  9/2016  Kopardekar ........ G08G 5/0082

OTHER PUBLICATIONS

Fern, et al., "UAS Contingency management: The Effect of Different Procedures on ATC in Civil Airspace Operations", American Institute of Aeronautics and Astronautics, Jun. 2014, pp. 1-13.

* cited by examiner

*Primary Examiner* — Adam D Tissot
*Assistant Examiner* — Aarron E Santos
(74) *Attorney, Agent, or Firm* — Alleman Hall & Tuttle LLP

(57) ABSTRACT

A method is provided for supporting an aircraft to execute a mission in which the aircraft maneuvers in an airspace system. The method includes detecting a lost-link event in which a datalink between the aircraft and a control station is interrupted or lost, and responsive to which the aircraft is preconfigured to execute a procedure. The method also includes conveying an intent of the aircraft to execute the procedure over a radio channel assigned for voice communication in the airspace system. In this regard, conveying the intent includes composing a message that indicates the intent of the aircraft to execute the procedure. The message is applied to a text-to-speech engine to convert the message to a corresponding verbal message in which the intent of the aircraft is conveyed. The corresponding verbal message is then sent over the radio channel assigned for voice communication in the airspace system.

24 Claims, 13 Drawing Sheets

(51) Int. Cl.
*B64U 101/00* (2023.01)
*G08G 5/00* (2006.01)

(58) Field of Classification Search
CPC .. G08G 5/0039; G08G 5/0078; G08G 5/0086;
G08G 5/04; G08G 5/045; G08G 5/0013;
G08G 5/0052; G08G 5/0056; G08G
5/0065; G08G 5/0004; G08G 5/0069;
G08G 5/0008; G08G 5/0021; G08G
5/0026; G08G 5/003; G08G 5/0082;
G08G 5/025; G01S 13/723; G01S 13/867;
G01S 13/933; H04N 5/33; B64C 13/18;
B64C 13/20; B64C 13/22; B64C 39/024;
B64U 2101/00; B64U 2201/10; H04L
45/125; H04L 67/12; H04L 45/02; H04L
45/24; H04L 12/40; H04L 12/403; H04L
43/0876; H04L 45/03; H04L 45/033;
H04L 45/38; H04L 45/56; H04L 45/74;
H04L 45/745; H04L 47/125; H04L
47/6275; H04L 49/109; H04L 63/105;
H04L 67/06; H04L 67/568; G06F 8/62;
G06F 8/65
See application file for complete search history.

SUPPORTING AN AIRCRAFT ON A MISSION IN WHICH AN INTENT OF THE AIRCRAFT IS CONVEYED RESPONSIVE TO A LOST-LINK EVENT

TECHNOLOGICAL FIELD

The present disclosure relates generally to robotics and, in particular, to one or more of the design, construction, operation or use of autonomous robots such as autonomous or semi-autonomous vehicles.

BACKGROUND

Many modern robots and other machines are designed to operate with increased autonomy and are less reliant on well-trained operators to safely operate. Some of these modern robots are manned while others are unmanned. In particular, a variety of unmanned vehicles include unmanned ground vehicles (UGVs), unmanned aerial vehicles (UAVs), unmanned surface vehicles (USVs), unmanned underwater vehicles (UUVs), unmanned spacecraft and the like. The use of unmanned vehicles has grown in recent years and these unmanned vehicles are employed in a wide variety of applications, including both military and civilian uses.

One focus in the field of robotics is in the improvement of autonomy, which often includes multiple aspects of robot operation. These aspects of robot operation include automatic control of a given robot to support remote human control. Another aspect is optimization systems (and associated methods) to determine how, for a given robot or set of robots, tasks should be ordered and/or allocated. And yet another aspect of robot operation is automatic, real-time or near real-time data processing, and exploitation in support of automatic route planning, mission execution and other activities.

Despite advancements, existing autonomy systems are typically configured to address only one aspect of these activities, thereby focusing its design of the underling autonomy algorithms and software architecture on a narrow mission set. This limits the extensibility of existing autonomy systems. Furthermore, it is generally desirable to improve existing systems to enhance their efficiency and operation.

It would therefore be desirable to have a system and method that takes into account at least some of the issues discussed above, as well as other possible issues.

BRIEF SUMMARY

Example implementations of the present disclosure provide a system and method for supporting an aircraft on a mission in which an intent of the aircraft is conveyed responsive to a lost-link event. According to example implementations, the intent of the aircraft may be conveyed by voice communication over a radio channel assigned to an airspace system in which the aircraft is traveling. The intent of the aircraft to execute the procedure may therefore be conveyed to those monitoring the radio channel, such as an air navigation service provider (ANSP) for the airspace system, as well as pilots of other aircraft in the airspace system. Example implementations may further monitor verbal communications on the radio channel to detect a gap during which the aircraft's intent may be conveyed, without disrupting traffic between the ANSP and pilots.

The present disclosure thus includes, without limitation, the following example implementations.

Some example implementations provide a method of supporting an aircraft to execute a mission in which the aircraft maneuvers in an airspace system, the method comprising detecting a lost-link event in which a datalink between the aircraft and a control station is interrupted or lost, and responsive to which the aircraft is preconfigured to execute a procedure; and conveying an intent of the aircraft to execute the procedure over a radio channel assigned for voice communication in the airspace system, conveying the intent including: composing a message that indicates the intent of the aircraft to execute the procedure; applying the message to a text-to-speech engine to convert the message to a corresponding verbal message in which the intent of the aircraft is conveyed; and sending the corresponding verbal message over the radio channel assigned for voice communication in the airspace system.

Other example implementations provide an apparatus for supporting an aircraft to execute a mission; and yet other example implementations provide a computer-readable storage medium for supporting an aircraft to execute a mission.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

Figure 3:
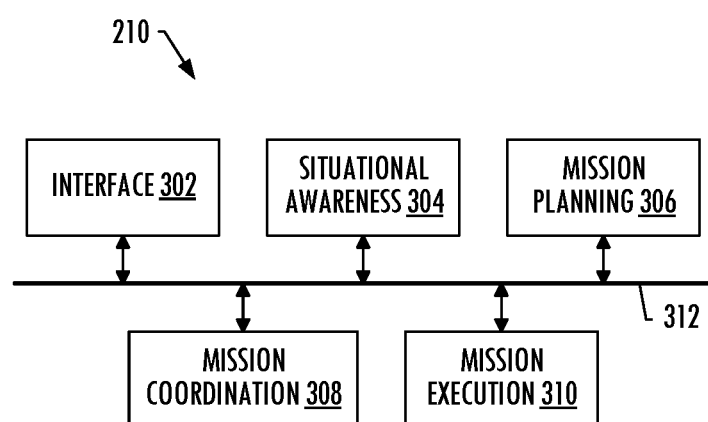
Figure 4A:
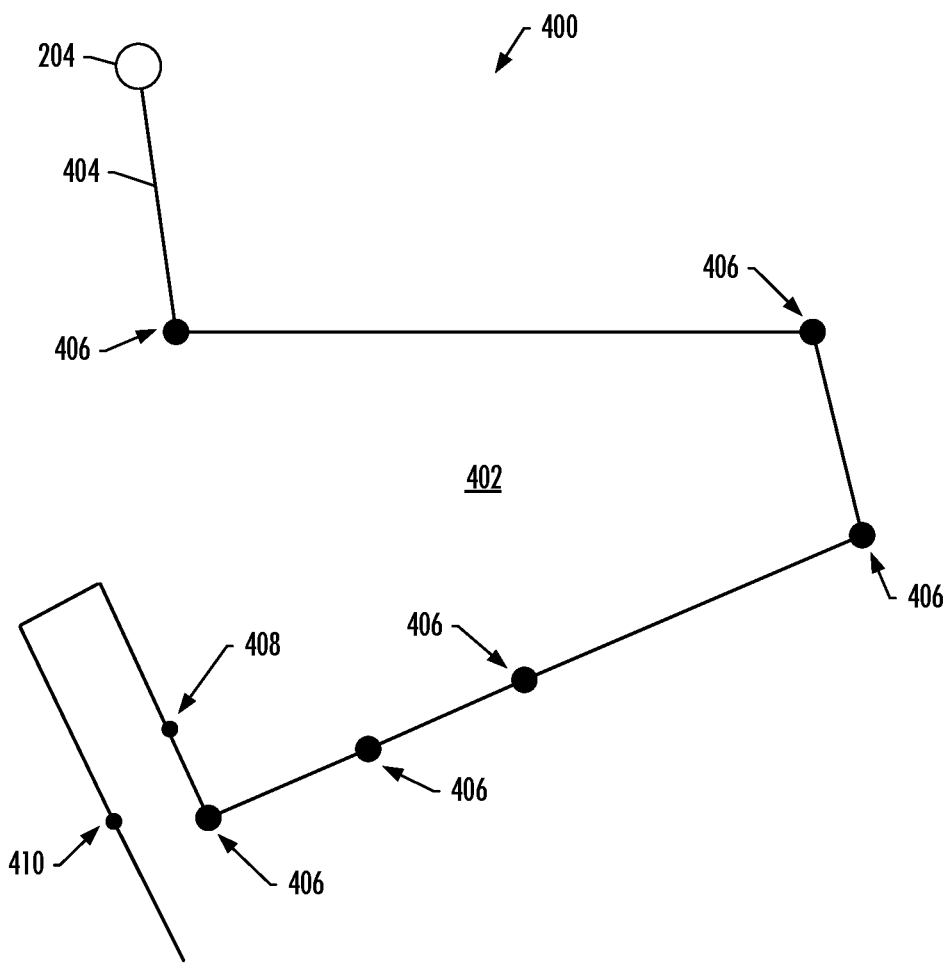
Figure 4B:
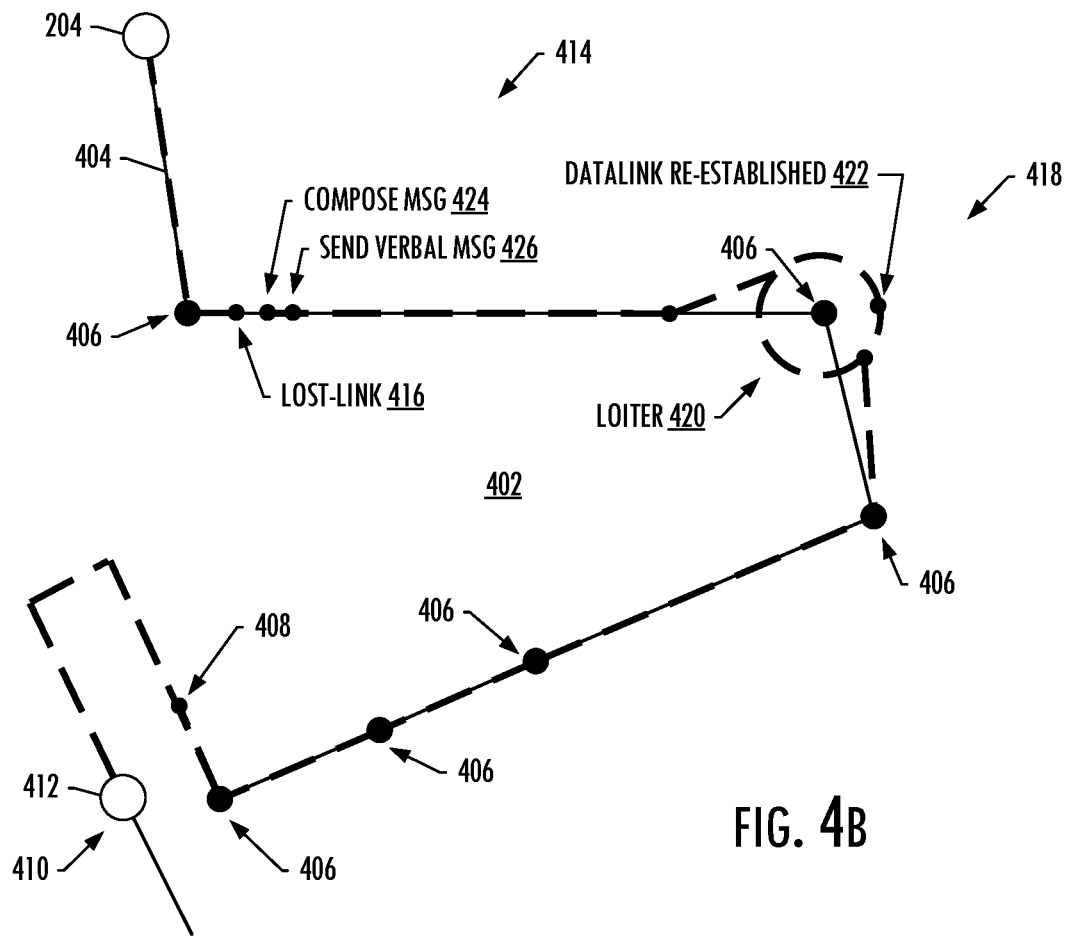
Figure 5:
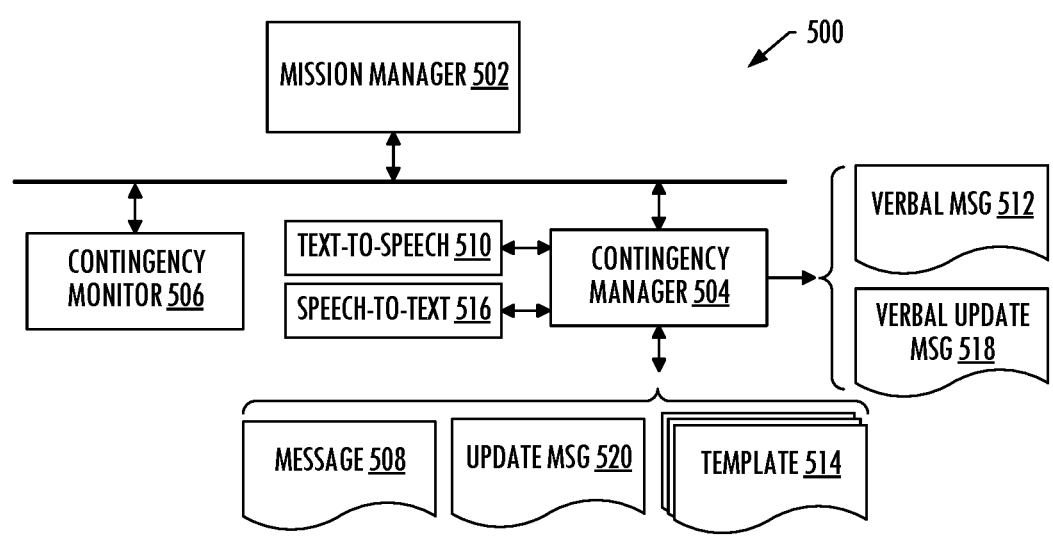
Figure 6:
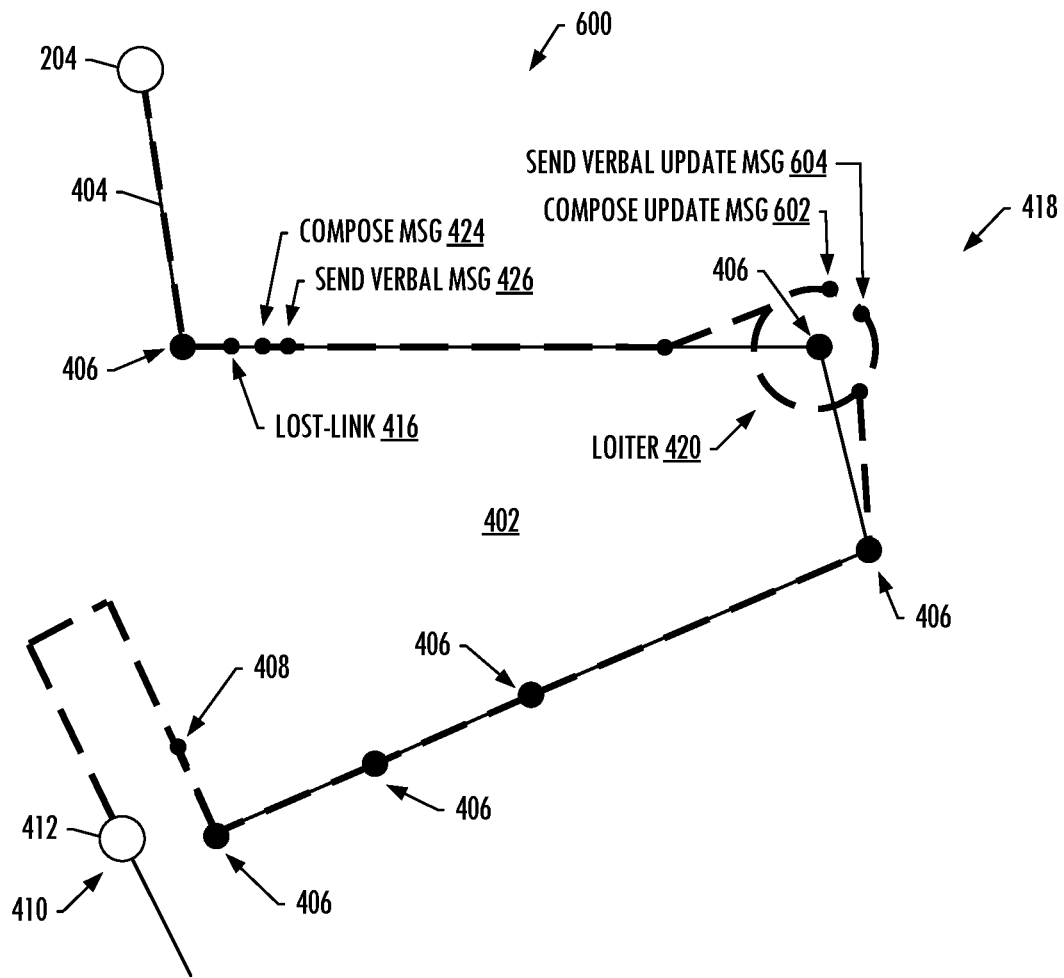
Figure 7:
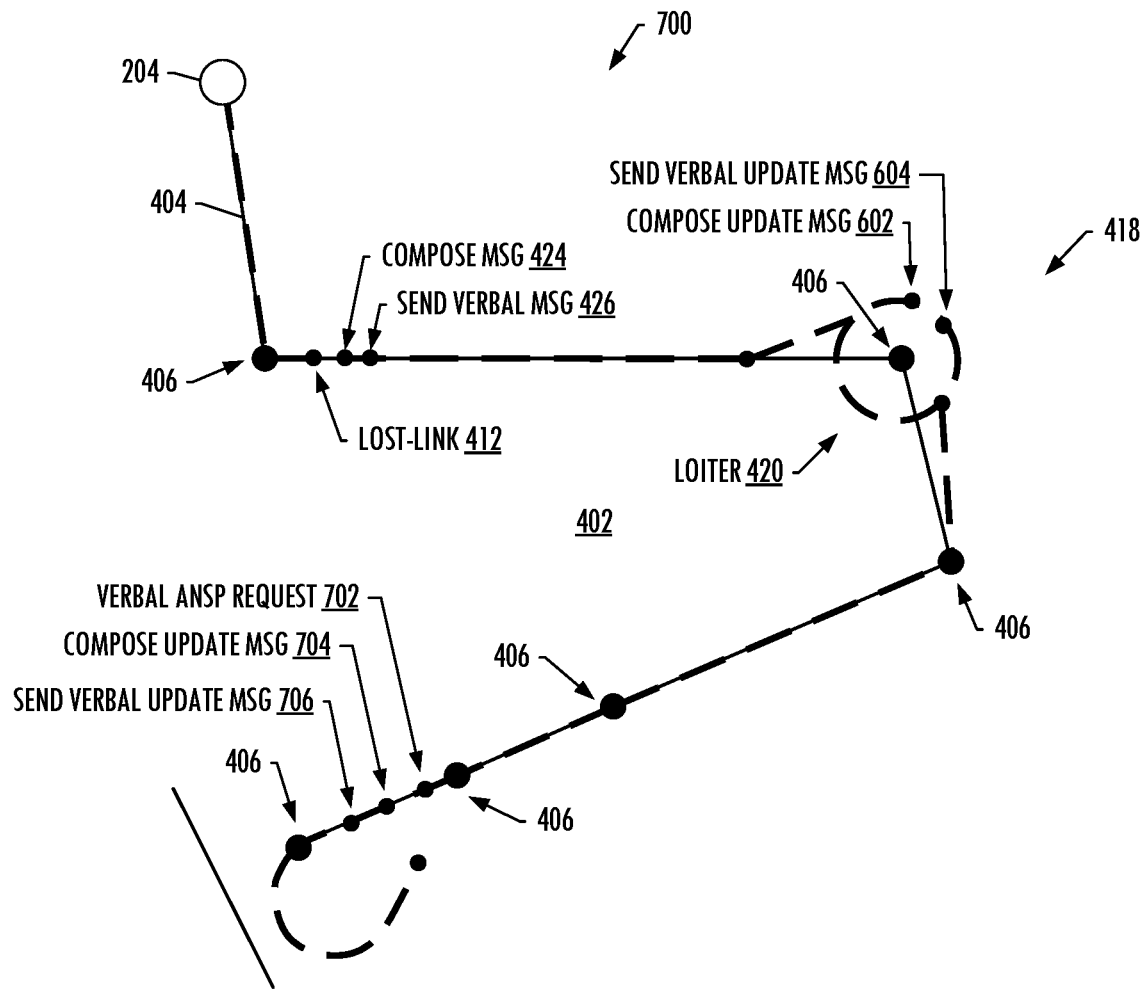
Figure 8:
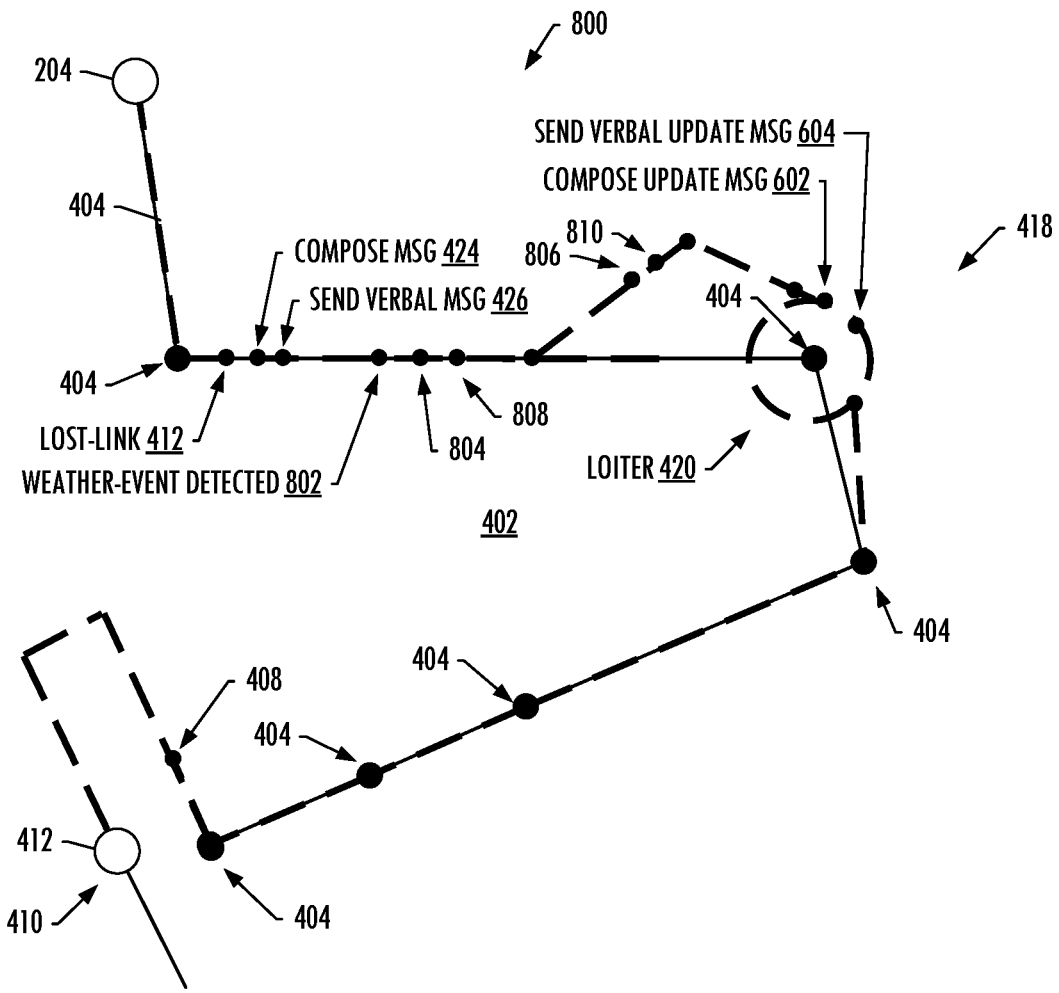
Figure 9A:
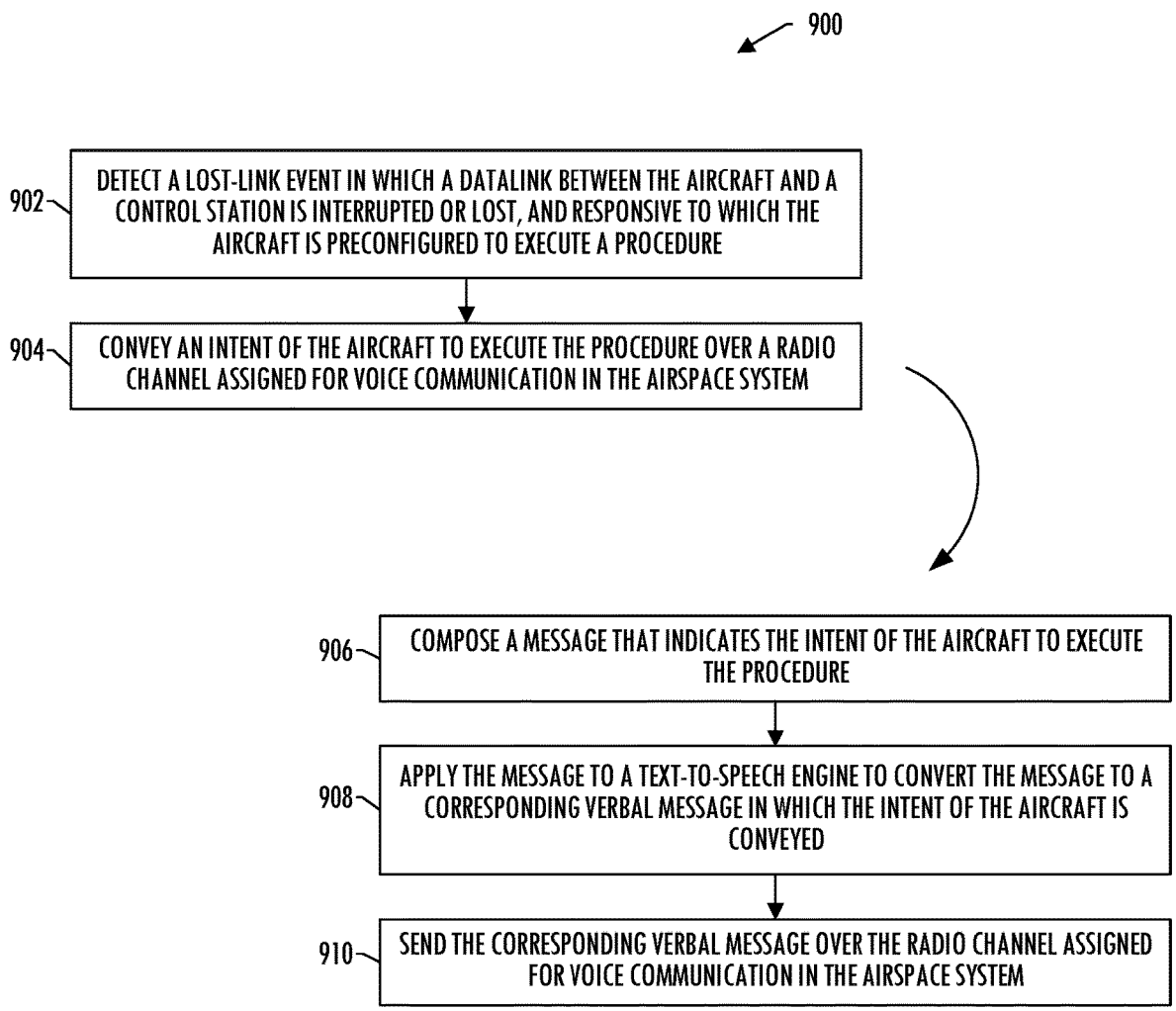
Figure 9B:
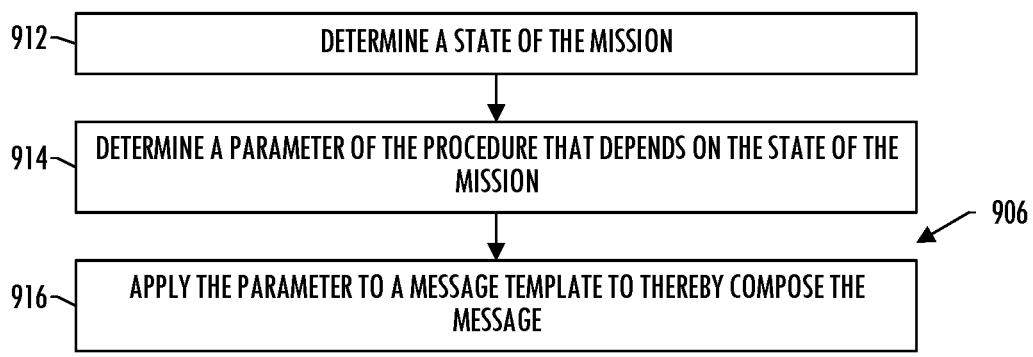
Figure 9C:
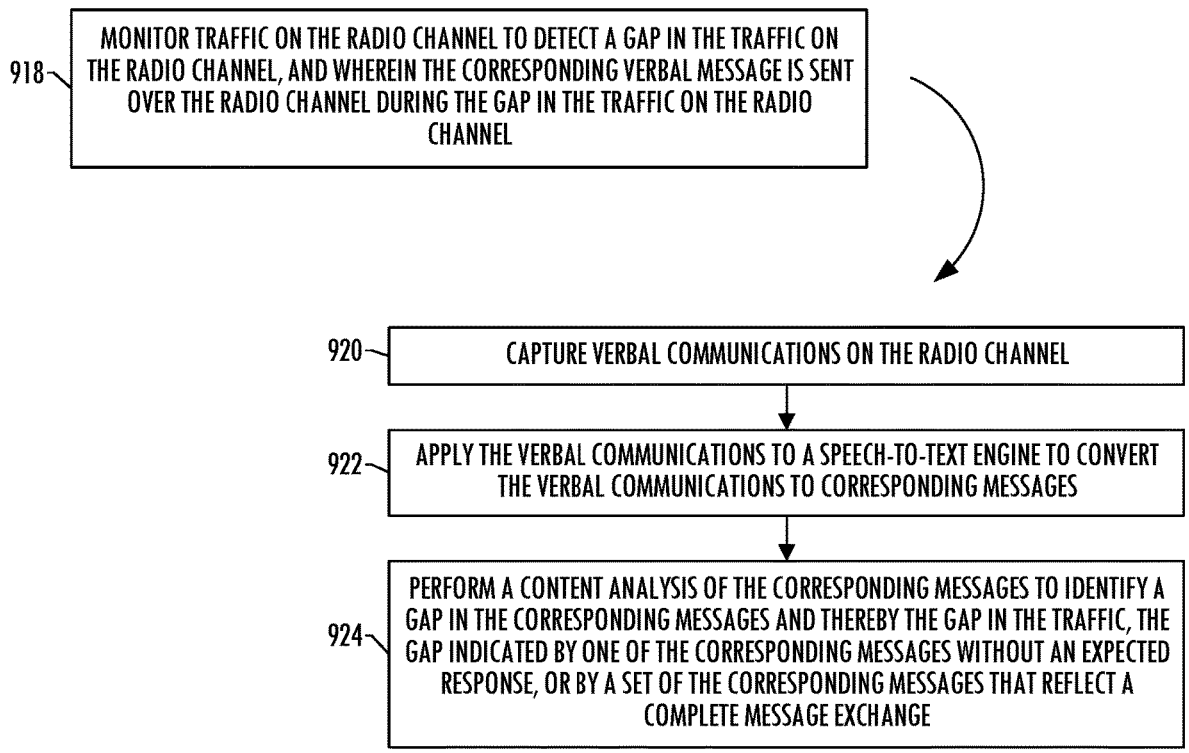
Figure 9D:
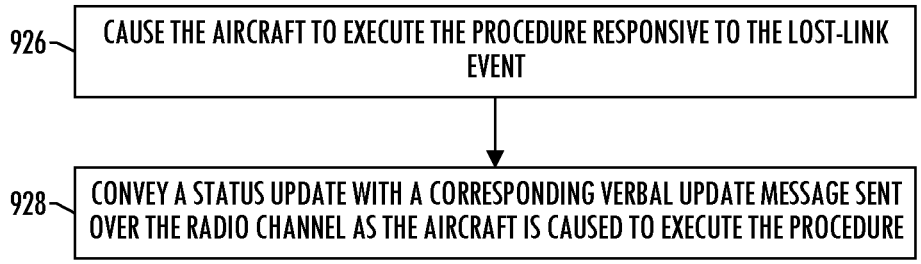
Figure 9E:
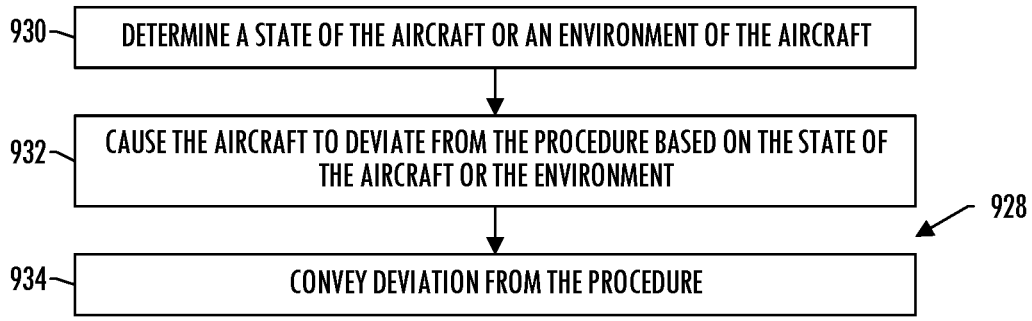
Figure 9F:
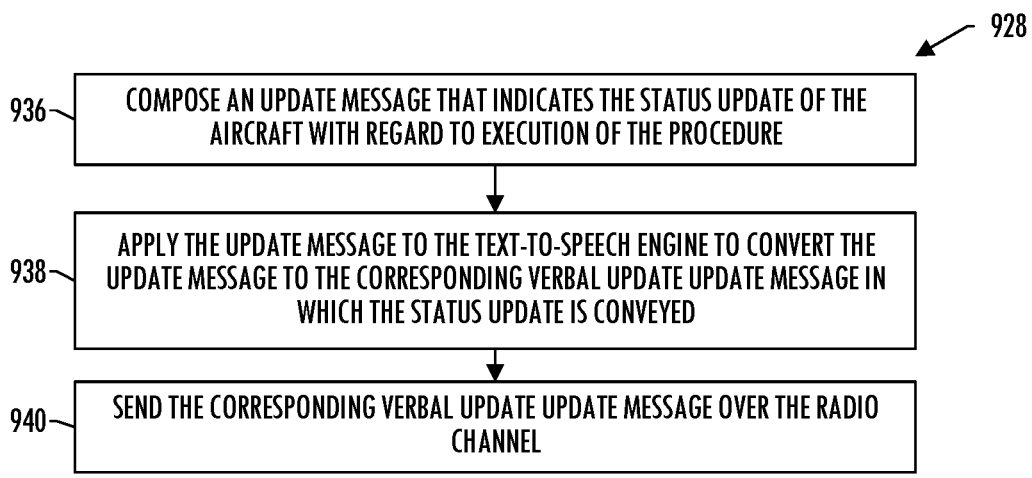
Figure 9G:
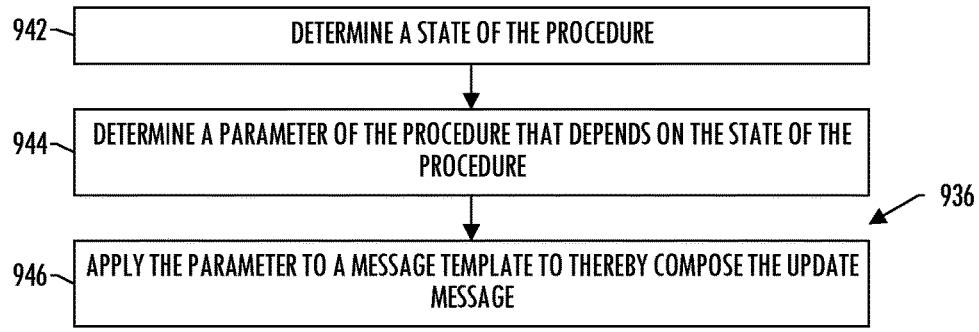
Figure 9H:
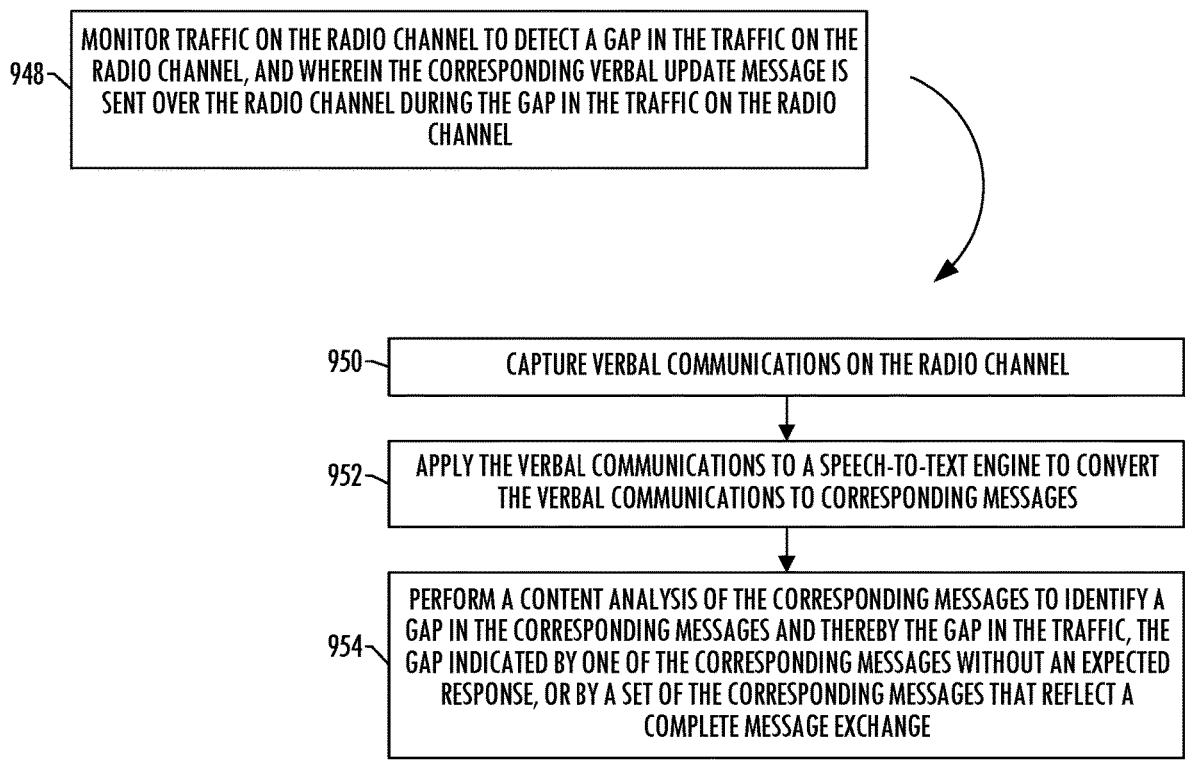
Figure 10:
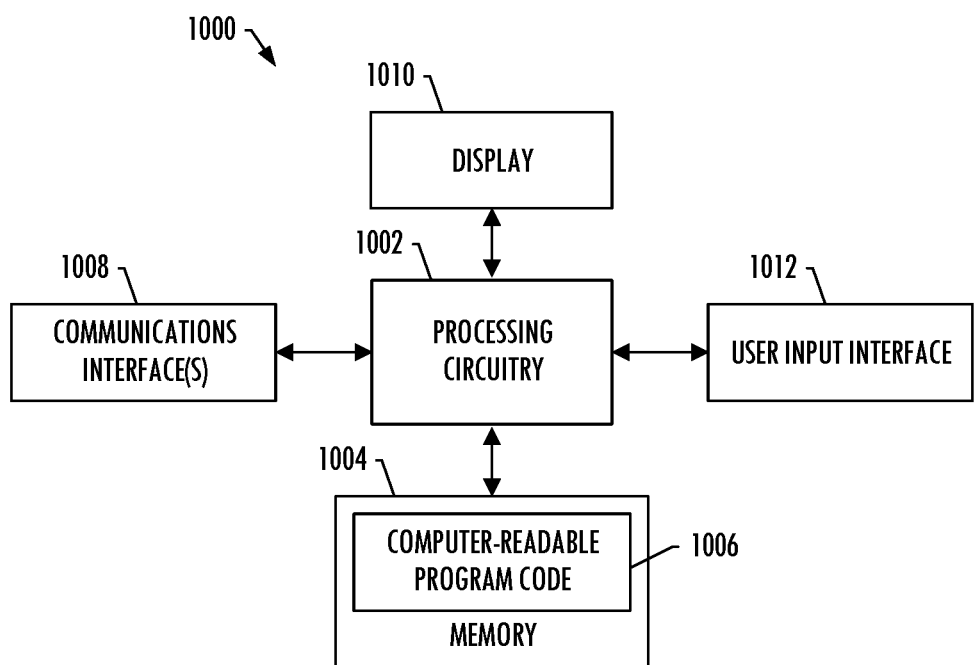

FIG. 3 more illustrates a mission management system (MMS) according to some example implementations;

FIGS. 4A and 4B illustrates a first scenario in which the aircraft is executing a mission, and a second scenario in which the aircraft executes a lost-link procedure in response to detection of a lost-link event, according to some example implementations;

FIG. 5 is a diagram of services that may be implemented by the MMS for supporting an aircraft to execute a mission, according to some example implementations;

FIGS. 6, 7 and 8 illustrate further example scenarios in which the aircraft is executing the mission during which a lost-link event is detected, according to various example implementations;

FIGS. 9A, 9B, 9C, 9D, 9E, 9F, 9G and 9H are flowcharts illustrating various steps in a method of supporting an aircraft to execute a mission, according to various example implementations; and FIG. 10 illustrates an apparatus according to some example implementations.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure relate generally to robotics and, in particular, to one or more of the design, construction, operation or use of robots. As used herein, a robot is a machine designed and configurable to execute maneuvers in its environment. The robot may be manned or unmanned. The robot may be fully human-controlled, or the robot may be semi-autonomous or autonomous in which at least some of the maneuvers are executed independent of or with minimal human intervention. In some examples, the robot is operable in various modes with various amounts of human control.

A robot designed and configurable to fly may at times be referred to as an aerial robot, an aerial vehicle, an aircraft or the like. A robot designed and configurable to operate with at least some level of autonomy may at times be referred to as an autonomous robot, or an autonomous aerial robot, autonomous aerial vehicle or autonomous aircraft in the case of an autonomous robot that is also designed and configurable to fly. Examples of suitable robots include aerobots, androids, automatons, autonomous vehicles, explosive ordnance disposal robots, hexapods, industrial robots, insect robots, microbots, nanobots, military robots, mobile robots, rovers, service robots, surgical robots, walking robots and the like. Other examples include a variety of unmanned vehicles, including unmanned ground vehicles (UGVs), unmanned aerial vehicles (UAVs), unmanned surface vehicles (USVs), unmanned underwater vehicles (UUVs), unmanned spacecraft and the like. These may include autonomous cars, planes, trains, industrial vehicles, fulfillment center robots, supply-chain robots, robotic vehicles, mine sweepers, and the like.

Figure 1:
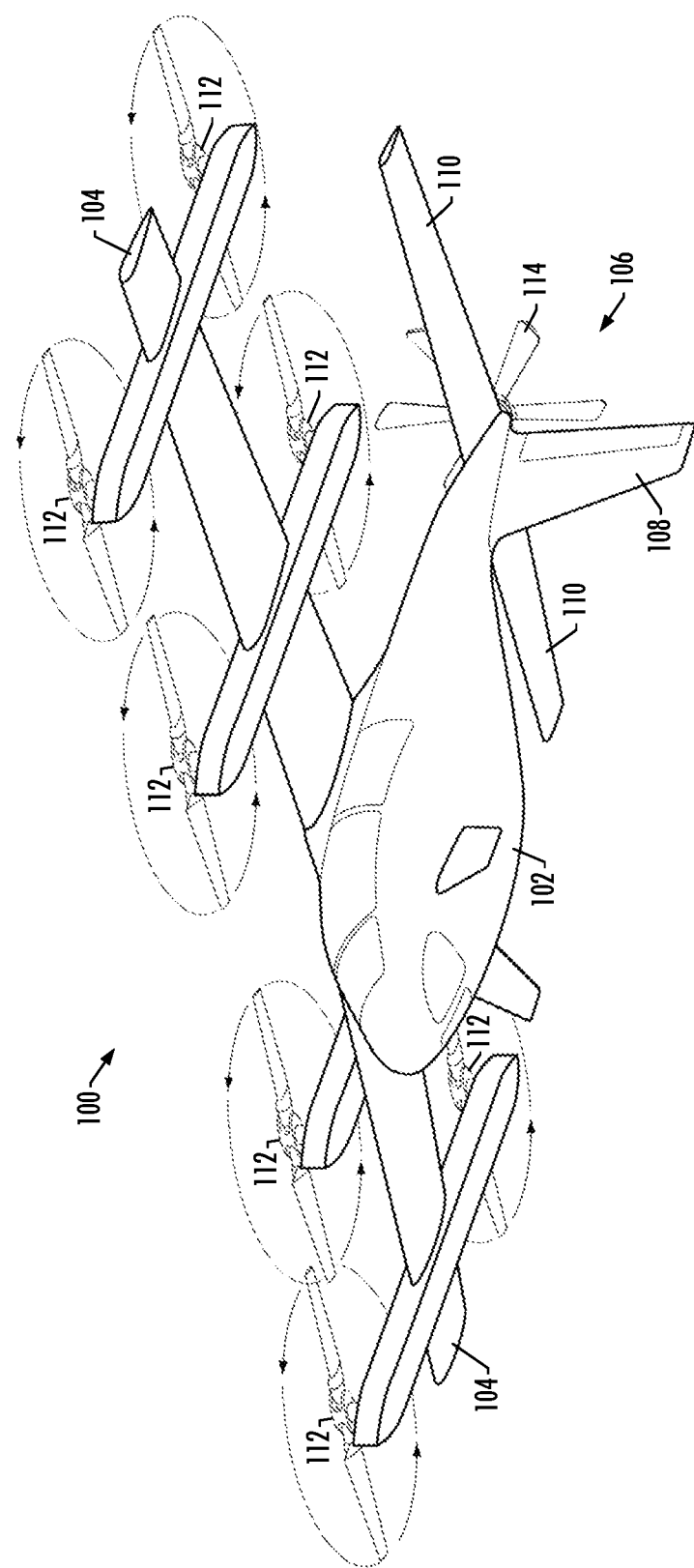
FIG. 1 illustrates one type of robot or more particularly aircraft, namely, an unmanned aerial vehicle, that may benefit from example implementations of the present disclosure.

FIG. 1 illustrates one type of robot or more particularly aircraft, namely, a UAV 100, that may benefit from example implementations of the present disclosure. As shown, the UAV generally includes a fuselage 102, wings 104 extending from opposing sides of the UAV in a mid-section of the fuselage, and an empennage or tail assembly 106 at a rear end of the fuselage. The tail assembly includes a vertical stabilizer 108 and two horizontal stabilizers 110 extending from opposing sides of the UAV. Rotors 112 and 114 are mounted to respectively the wings and the end of the tail assembly for lifting and propelling the UAV during flight.

Figure 2:
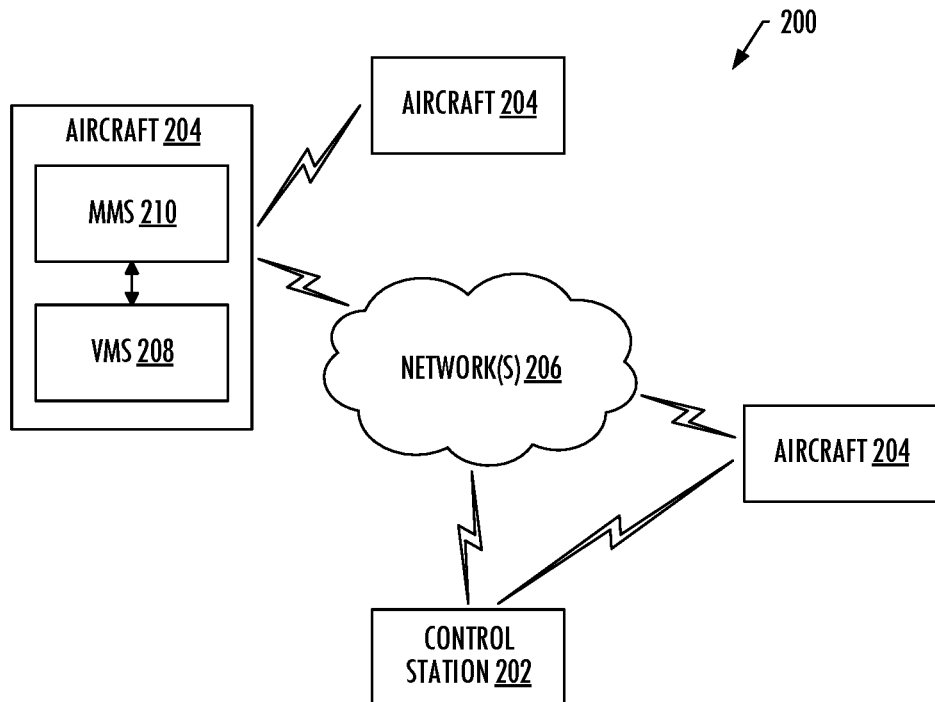
FIG. 2 illustrates a system according to some example implementations.

FIG. 2 illustrates a system 200 according to some example implementations of the present disclosure. The system may include any of a number of different subsystems (each an individual system) for performing one or more functions or operations. As shown, in some examples, the system includes a control station 202 and one or more robots such as one or more aircraft 204 (e.g., one or more UAVs 100). The control station provides facilities for communication with or control of the one or more aircraft, such as by wired or wireless data links directly or across one or more networks 206. In some examples, the control station may be a ground station, and not in all cases control the aircraft. In this regard, the control station may be configured to monitor the aircraft. The control station may initiate mission, but the control station may not control the aircraft to maneuver. At times, then, the control station may enable or provide a distributed network/server of software functions.

The aircraft 204 includes a robot management system (RMS) implemented as a vehicle management system (VMS) 208 and a mission management system (MMS) 210. The RMS is a robot-specific subsystem configured to manage subsystems and other components of the robot, and the VMS is a particular RMS implementation for a vehicle such as an aircraft. These subsystems and other components include, for example, maneuver controls, landing gear, onboard environmental systems, electrical, pneumatic and hydraulic systems, communications systems, navigation systems and other subsystems and components for controlling operation and maneuvering of the robot. The RMS/VMS is configured to accept maneuver commands such as waypoints and/or steering commands, and control the robot/aircraft to follow those maneuver commands.

The MMS 210 is a subsystem configured to manage missions of the aircraft 204. A mission is a deployment of the aircraft (one or more aircraft) to achieve one or more mission objectives. A mission may be decomposed into maneuvers of the aircraft with optional sensor and/or effector scheduling, and the MMS may execute tasks to manage the aircraft to execute maneuvers with specific parameters and capabilities. The MMS 210 includes subsystems to process sensor data to situational awareness, plan tasks for the aircraft (or multiple aircraft), coordinate with teams to assign tasks, execute assigned tasks. The MMS is also configured to interface with the VMS 208, and in some examples the control station 202. Although the MMS is shown on the aircraft, the MMS may instead be at the control station; or in some examples, the MMS may be distributed between the aircraft and the control station.

In some examples, the MMS 210 provides a complete, end-to-end autonomy architecture with open system architecture standards and parameterized to allow rapid extension and reapplication to a variety of robots including aircraft 204. The flexibility of the MMS enables an operator to code it once, but to apply it anywhere. The MMS may therefore be applied to virtually any robot that applies, or benefits from, autonomy. The MMS may include an adaptable autonomy architecture that is applicable to a variety of robots, including those identified above. A benefit of the MMS is therefore not only in the specific contents, but also in the specific details of the architecture, its subroutines, and in the interfaces between those subroutines and other systems/devices that support rapid extensibility and adaptability of the MMS to a variety of domains.

FIG. 3 more particularly illustrates the MMS 210 according to some example implementations of the present disclosure. The MMS may include any of a number of different subsystems (each an individual system) for performing one or more functions or operations. As shown, in some examples, the MMS includes an interface subsystem 302, a situational awareness subsystem 304, a mission planning subsystem 306, a mission coordination subsystem 308, and a mission execution subsystem 310. As suggested above, in some examples, the subsystems of the MMS may be on the aircraft 204, at the control station 202, or distributed between the aircraft and the control station. The subsystems may be configured to communicate with one another directly, over a communication bus 312, or across the network(s) 206 in examples in which the MMS is distributed between the aircraft and the control station.

The subsystems enable the MMS 210 of the aircraft 204 to interface with the system 200, perform situational awareness, plan a mission including a plurality of tasks, coordinate the plurality of tasks and thereby the mission with other aircraft 204, and execute the mission. For example, the MMS may use the interface subsystem 302 to interface with various sensors onboard the aircraft, the VMS 208, the control station 202 and/or other aircraft. The MMS may use the situational awareness subsystem 304 to acquire sensor data and maintain an awareness of the state of the environment in which the aircraft is operating. The MMS may use the mission planning subsystem 306 to plan a mission including or associated with a plurality of tasks, and which may incorporate rules of engagement, tactics and other constraints on operations. The MMS may likewise use the mission planning subsystem to dynamically replan a mission in which changes to the mission are made in real-time or near real-time as the mission is executed. The MMS may use the mission coordination subsystem 308 to coordinate the plurality of tasks of the mission with other aircraft and users, where agreed-upon tasks may then be executed by the MMS using the mission execution subsystem 310.

According to some example implementations of the present disclosure, the MMS 210 is also configured to implement software functionality or functionalities (at times referred to as services) during a mission to support the aircraft 204.

FIG. 4A illustrates a first scenario 400 in which the aircraft 204 is executing a mission in which the aircraft maneuvers in an airspace system 402. The airspace system is served by an air navigation service provider (ANSP), and includes an airspace, infrastructure and rules, regulations and the like for navigating the airspace. The ANSP is generally a public or private entity that provides air navigation services, and manages air traffic for an organization, region or country. One example of an ANSP in the United States is the Federal Aviation Administration (FAA). Examples of suitable airspace systems include the National Airspace System (NAS) and the new NextGen system that are served by the FAA.

During the mission, the aircraft may take a planned path 404, and this path may be described by a series of waypoints 406 that define a route the aircraft will travel, as well as points 408, 410 at which an autonomous landing is initiated and the aircraft lands at an airport 412. The aircraft travels with a velocity (speed and direction of motion), and the series of waypoints and velocities that define the route with respect to time defines a trajectory of the aircraft (at times referred to as a track of the aircraft).

FIG. 4B illustrates a second scenario 414 in which the aircraft 204 is executing the mission during which a lost-link 416 event is detected. The lost-link event is an event in which a datalink between the aircraft and the control station 202 is interrupted or lost. One example of a suitable datalink is a command and control (C2) link between the aircraft and the ground station. Responsive to the lost-link event, the aircraft is preconfigured to execute a procedure such as a lost-link procedure 418. As shown, for example, the lost-link procedure may include the aircraft proceeding to a predefined waypoint and loiter 420 for no more than a defined time period (e.g., 30 minutes), while the aircraft attempts to re-establish the datalink. If the datalink is re-established 422 in the defined time period, the aircraft may return to the planned path 404; otherwise, if the datalink is not re-established within the defined time period, the aircraft is to proceed to an airport 412 and land. This airport may be a closest available airport or another target airport.

FIG. 5 is a diagram of services 500 that may be implemented by the MMS 210 to support the aircraft 204 on a mission, according to some example implementations. As shown, the services may include a mission manager 502 service that may be implemented by the mission execution subsystem 310. The mission manager service is generally configured to identify a mission that is executable by the aircraft to achieve a mission objective. As suggested above, a mission may contemplate the occurrence of various contingency events such as a lost-link 416 event in which a datalink between the aircraft and the control station 202 is interrupted or lost. The services 500, then, further include a contingency manager 504 service and a contingency monitor 506 service that may be implemented by the mission execution subsystem 310.

The contingency manager 504 service is configured to manage contingency events during the mission, and the contingency monitor 506 service is configured to monitor for those contingency events. This may include the situational awareness subsystem 304 configured to determine at least one of a state of the aircraft 204, a status of the aircraft, a state of the mission, or a state of the environment, some or all of which may be reflected in or determined from input data. In some examples, at least some of the input data may be provided by or determined from data provided by various sensors onboard the aircraft, the VMS 208 and/or the control station 202, which may interface with the MMS 210 using the interface subsystem 302. The state of the environment may in some examples be provided by or determined from data provided by the situational awareness subsystem.

The situational awareness subsystem 304 is configured to monitor a state of the aircraft 204 and a state of the environment of the aircraft. The state of the aircraft may be defined by the aircraft's pose (position and orientation), and in some examples, the aircraft's velocity. The state of the environment may be defined in a number of different manners, such as based on objects in the environment, their number, size, congestion, stationary or moving, the presence of people in the environment, weather in the environment, and the like. In this regard, the state of the environment includes a perception of objects in the environment. In some examples, the state of the environment is monitored using sensor data acquired from one or more sensors onboard the aircraft. Examples of suitable sensors include those employing technologies such as acoustics, radio, optics and the like. More particular examples of suitable sensors include those employing radar, lidar, infrared sensors, cameras and the like. Another example of a suitable sensor is an automatic, dependent surveillance-broadcast (ADS-B) receiver configured to receive ADS-B signals.

According to some particular example implementations of the present disclosure, the contingency monitor 506 service is configured to detect a lost-link event 416 in which a datalink (e.g., C2 link) between the aircraft 204 and a control station 202 is interrupted or lost. Responsive to detection of the lost-link event, the aircraft is preconfigured to execute a procedure such as a lost-link procedure 418, which may be managed by the contingency manager 504 service. This may include the MMS 210 configured to send one or more maneuver commands to the VMS 208 to control the aircraft to follow the maneuver commands and thereby execute respective maneuvers to carry out the procedure.

The contingency manager 504 service is also configured to convey an intent of the aircraft 204 to execute the procedure over a radio channel assigned for voice communication in the airspace system 402. The intent of the aircraft to execute the procedure may therefore be conveyed to those monitoring the radio channel, such as an ANSP for the airspace system, as well as pilots of other aircraft in the airspace system.

In more particular examples, the contingency manager 504 service is configured to compose a message 508 that indicates the intent of the aircraft 204 to execute the procedure. The contingency manager service is configured to apply the message to a text-to-speech engine 510 to convert the message to a corresponding verbal message 512 in which the intent of the aircraft is conveyed. And the contingency manager service is configured to send the corresponding verbal message over the radio channel assigned for voice communication in the airspace system 402. In the second scenario 414 shown in FIG. 4B, the message may be composed at point 424 after the lost-link event 416 is detected, and the corresponding verbal message may be sent at point 426.

One example of a suitable message may be composed as follows (with dynamic parameters in brackets):

Exercise, exercise, exercise; [aircraft identifier] unmanned aircraft; [distance and position relative to identified airport] at [altitude]; heading east squawking seven four zero zero; in lost link, proceeding direct [waypoint] to hold. Exercise, exercise, exercise.

In this example, "squawking" refers to setting a particular transponder code that may be used to help an air traffic controller or ANSP for the airspace system 402 locate the aircraft 204 on their radar screen. Some codes maybe general, like the code 1200 that indicates the aircraft is flying according to visual flight rules; or codes 7500, 7600 and 7700 that indicates respectively hijack, radio-failure and emergency. Other codes may be individually assigned by the controller to uniquely identify aircraft. The code 7400 may be used as a generic code specific to unscrewed/unmanned aircraft that indicates loss of the C2 link.

In some examples, the situational awareness subsystem 304 is configured to determine a state of the mission. In some of these examples, the contingency manager 504 service is configured to determine a parameter of the procedure that depends on the state of the mission, and apply the parameter to a message template 514 to thereby compose the message 508. One example of a suitable parameter is an identifier of an airport 412 when the procedure is a lost-link procedure that is executable to cause the aircraft 204 to land at the airport. In some further examples, the state of the mission, and the parameter of the procedure, are determined and updated as the mission is executed. This may be the case for the airport in that the identifier may be that of an airport closest to the aircraft that is updated as the mission is executed.

In some examples, the contingency manager 504 service is further configured to monitor traffic on the radio channel to detect a gap in the traffic on the radio channel. The corresponding verbal message 512 is then sent over the radio channel during the gap in the traffic on the radio channel. More particularly, this may include the contingency manager service configured to capture verbal communications on the radio channel. The contingency manager service is configured to apply the verbal communications to a speech-to-text engine 516 to convert the verbal communications to corresponding messages. And the contingency manager service is configured to perform a content analysis of the corresponding messages to identify a gap in the corresponding messages and thereby the gap in the traffic, the gap indicated by one of the corresponding messages without an expected response, or by a set of the corresponding messages that reflect a complete message exchange.

In some examples, the MMS 210 and in particular the mission execution subsystem 310 of the MMS may cause the aircraft 204 to execute the procedure responsive to the lost-link event 416. Again, this may include the MMS 210 configured to send one or more maneuver commands to the VMS 208 to control the aircraft to follow the maneuver commands and thereby execute respective maneuvers to carry out the procedure. In some of these examples, the contingency manager 504 service is further configured to convey a status update with a corresponding verbal update message 518 sent over the radio channel as the aircraft is caused to execute the procedure. As the procedure is executed, the situational awareness subsystem 304 may be configured to determine a state of the aircraft 204 or an environment of the aircraft, and the mission execution subsystem 310 may be configured to cause the aircraft to deviate from the procedure based on the state of the aircraft or the environment. The status update in these examples may include the aircraft's deviation from the procedure.

The status update may be conveyed in a number of different manners. In this regard, the status update may be conveyed in a manner similar to the intent of the aircraft 204 to execute the procedure. That is, the contingency manager 504 service may be configured to compose an update message 520 that indicates the status update of the aircraft with regard to execution of the procedure. The contingency manager service may apply the update message to the text-to-speech engine 510 to convert the update message to the corresponding verbal update message 518, and send the corresponding verbal update message over the radio channel. Additionally or alternatively, the situational awareness subsystem 304 may determine a state of the procedure, and the contingency manager service may determine a parameter of the procedure that depends on the state of the procedure, and apply the parameter to a message template 514 to thereby compose the update message 520.

Also similar to the corresponding verbal message 512, in some examples, the contingency manager 504 service is further configured to monitor traffic on the radio channel to detect a gap in the traffic on the radio channel. The contingency manager 504 service may then send the corresponding verbal update message 518 over the radio channel during the gap in the traffic on the radio channel.

To further illustrate example implementations of the present disclosure, FIGS. 6, 7 and 8 illustrate further example scenarios in which the aircraft 204 is executing the mission during which a lost-link 416 event is detected. In the second scenario 414 shown in FIG. 4B, the datalink is re-established within the defined time period, as the aircraft is in loiter 420. FIG. 6 illustrates a third scenario 600 in which the datalink is not re-established within the defined time period. In this scenario, the procedure calls for the aircraft to proceed to the airport 412 and land. In the third scenario, an update message may be composed at point 602, and the corresponding verbal update message may be sent at point 604. One example of a suitable update message may be composed as follows (with dynamic parameters in brackets):

Exercise, exercise, exercise; [aircraft identifier] unmanned aircraft; holding at [waypoint], squawking seven four zero zero; in lost link, executing approach to [identified airport] in five minutes. Exercise, exercise, exercise.

In some cases, the aircraft 204 executing the lost-link procedure 418 may have a large disruption in the airspace system 402. The lost-link procedure may therefore be designed to give the ANSP time to clear a path to the airport 412 if the datalink is not re-established. In some examples, this disruption may be reduced by providing the ANSP with the ability to modify the aircraft's behavior in lost link. FIG. 7 illustrates a fourth scenario 700 that is similar to the third scenario 600, but that includes this modification.

In some examples including the fourth scenario 700, the contingency manager 504 service is configured to monitor traffic on the radio channel, and capture verbal communications on the radio channel to detect a request from the ANSP as a verbal request directed to the aircraft 204 at point 702. The contingency manager service is configured to apply the verbal request to the speech-to-text engine 516 to convert the verbal request to a corresponding request message. The contingency manager is configured to interpret the request message, and signal the mission execution subsystem 310 to cause the aircraft to execute the request. In the fourth scenario, the request may be for the aircraft to execute a missed approach procedure as the aircraft is on approach to the airport, such as follows:

[aircraft identifier], Execute Missed Approach

The contingency manager 504 service is configured to compose a second update message at point 704, and send the corresponding second verbal update message at point 706. One example of a suitable second update message may be composed as follows (with dynamic parameters in brackets):

[aircraft identifier], Executing Missed Approach

FIG. 8 illustrates a fifth scenario 800 that is also similar to the third scenario 600, but includes a deviation from the lost-link procedure 418. That is, as the lost-link procedure is executed, the situational awareness subsystem 304 may determine a state of the environment of the aircraft 204 at point 802, such as a weather-related event that the aircraft may seek to avoid. The mission execution subsystem 310, then, may generate an avoidance maneuver, and cause the aircraft to execute the avoidance maneuver to deviate from the procedure. Then at some point, the mission execution subsystem may cause the aircraft to return to the lost-link procedure. In this scenario, the contingency manager 504 service may compose further update messages at points 804, 806 and send the corresponding verbal update messages at points 808, 810, to convey the aircraft's deviation from and return to the lost-link procedure.

FIGS. 9A-9H are flowcharts illustrating various steps in a method 900 of supporting an aircraft to execute a mission in which the aircraft maneuvers in an airspace system 402, according to various example implementations of the present disclosure. The method includes detecting a lost-link event in which a datalink (e.g., C2 link) between the aircraft and a control station is interrupted or lost, and responsive to which the aircraft is preconfigured to execute a procedure (e.g., lost-link procedure executable to cause the aircraft to land at an airport), as shown at block 902 of FIG. 9A. And the method includes conveying an intent of the aircraft to execute the procedure over a radio channel assigned for voice communication in the airspace system, as shown at block 904.

As also shown in FIG. 9A, conveying the intent at 904 includes composing a message that indicates the intent of the aircraft to execute the procedure, as shown at block 906. The message is applied to a text-to-speech engine to convert the message to a corresponding verbal message in which the intent of the aircraft is conveyed, as shown at block 908. The corresponding verbal message is then sent over the radio channel assigned for voice communication in the airspace system 402, as shown at block 910.

In some examples, the method 900 further includes determining a state of the mission, as shown at block 912 of FIG. 9B. The method includes determining a parameter of the procedure that depends on the state of the mission, as shown at block 914. And composing the message at block 906 includes applying the parameter to a message template to thereby compose the message, as shown at block 916.

In some examples, the state of the mission, and the parameter of the procedure, are determined and updated as the mission is executed. In further examples in which the procedure is a lost-link procedure that is executable to cause the aircraft to land at an airport, the parameter includes an identifier of the airport.

In some examples, the method 900 further includes monitoring traffic on the radio channel to detect a gap in the traffic on the radio channel, and the corresponding verbal message is sent over the radio channel during the gap in the traffic on the radio channel, as shown at block 918 of FIG. 9C. In some further examples, monitoring the traffic on the radio channel includes capturing verbal communications on the radio channel, as shown at block 920. The verbal communications are applied to a speech-to-text engine to convert the verbal communications to corresponding messages, as shown at block 922. A content analysis of the corresponding messages is then performed to identify a gap in the corresponding messages and thereby the gap in the traffic, as shown at block 924. In this regard, the gap is indicated by one of the corresponding messages without an expected response, or by a set of the corresponding messages that reflect a complete message exchange.

In some examples, the method 900 further includes causing the aircraft to execute the procedure responsive to the lost-link event, as shown at block 926 of FIG. 9D. A status update is then conveyed with a corresponding verbal update message sent over the radio channel as the aircraft is caused to execute the procedure, as shown at block 928.

In some examples, the method 900 further includes determining a state of the aircraft or an environment of the aircraft, as shown at block 930 of FIG. 9E. The method in some of these examples also includes causing the aircraft to deviate from the procedure based on the state of the aircraft or the environment, and conveying deviation from the procedure, as shown at blocks 932 and 934.

In some further examples, conveying the status update at block 928 includes composing an update message that indicates the status update of the aircraft with regard to execution of the procedure, as shown at block 936 of FIG. 9F. The method includes applying the update message to the text-to-speech engine to convert the update message to the corresponding verbal update message in which the status update is conveyed, as shown at block 938. And the method includes sending the corresponding verbal update message over the radio channel, as shown at block 940.

In some examples, the method 900 further includes determining a state of the procedure, as shown at block 942 of FIG. 9G. The method also includes determining a parameter of the procedure that depends on the state of the procedure, as shown at block 944. And composing the update message at block 936 includes applying the parameter to a message template to thereby compose the update message, as shown at block 946.

In some examples, the method 900 further includes monitoring traffic on the radio channel to detect a gap in the traffic on the radio channel, as shown at block 948 of FIG. 9H. In some of these examples, the corresponding verbal update message is sent over the radio channel during the gap in the traffic on the radio channel.

In some further examples, monitoring the traffic on the radio channel at block 948 includes capturing verbal communications on the radio channel, as shown at block 950. The verbal communications are applied to a speech-to-text engine to convert the verbal communications to corresponding messages, as shown at block 952. A content analysis of the corresponding messages is then performed to identify a gap in the corresponding messages and thereby the gap in the traffic, as shown at block 954. Once again, the gap is indicated by one of the corresponding messages without an expected response, or by a set of the corresponding messages that reflect a complete message exchange.

According to example implementations of the present disclosure, the MMS 210 and its subsystems including the interface subsystem 302, situational awareness subsystem 304, mission planning subsystem 306, mission coordination subsystem 308 and mission execution subsystem 310 may be implemented by various means. Means for implementing the MMS and its subsystems may include hardware, alone or under direction of one or more computer programs from a computer-readable storage medium. In some examples, one or more apparatuses may be configured to function as or otherwise implement the MMS and its subsystems shown and described herein. In examples involving more than one apparatus, the respective apparatuses may be connected to or otherwise in communication with one another in a number of different manners, such as directly or indirectly via a wired or wireless network or the like.

FIG. 10 illustrates an apparatus 1000 according to some example implementations of the present disclosure. Generally, an apparatus of exemplary implementations of the present disclosure may comprise, include or be embodied in one or more fixed or portable electronic devices. The apparatus may include one or more of each of a number of components such as, for example, processing circuitry 1002 (e.g., processor unit) connected to a memory 1004 (e.g., storage device).

The processing circuitry 1002 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 1004 (of the same or another apparatus).

The processing circuitry 1002 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 1004 is generally any piece of computer hardware that is capable of storing information such as, for example, data, computer programs (e.g., computer-readable program code 1006) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1004, the processing circuitry 1002 may also be connected to one or more interfaces for displaying, transmitting and/or receiving information. The interfaces may include a communications interface 1008 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1010 and/or one or more user input interfaces 1012 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 1000 may include a processing circuitry 1002 and a computer-readable storage medium or memory 1004 coupled to the processing circuitry, where the processing circuitry is configured to execute computer-readable program code 1006 stored in the memory. It will also be understood that one or more functions, and combinations of functions, may be implemented by special purpose hardware-based computer systems and/or processing circuitry which perform the specified functions, or combinations of special purpose hardware and program code instructions.

As explained above and reiterated below, the present disclosure includes, without limitation, the following example implementations.

Clause 1. An apparatus for supporting an aircraft to execute a mission in which the aircraft maneuvers in an airspace system, the apparatus comprising: a memory configured to store computer-readable program code; and processing circuitry configured to access the memory, and execute the computer-readable program code to cause the apparatus to at least: detect a lost-link event in which a datalink between the aircraft and a control station is interrupted or lost, and responsive to which the aircraft is preconfigured to execute a procedure; and convey an intent of the aircraft to execute the procedure over a radio channel assigned for voice communication in the airspace system, including the apparatus caused to: compose a message that indicates the intent of the aircraft to execute the procedure; apply the message to a text-to-speech engine to convert the message to a corresponding verbal message in which the intent of the aircraft is conveyed; and send the corresponding verbal message over the radio channel assigned for voice communication in the airspace system.

Clause 2. The apparatus of clause 1, wherein the datalink is a command and control (C2) link between the aircraft and the ground station.

Clause 3. The apparatus of clause 1 or clause 2, wherein the procedure is a lost-link procedure that is executable to cause the aircraft to land at an airport.

Clause 4. The apparatus of any of clauses 1 to 3, wherein the processing circuitry is configured to execute the computer-readable program code to cause the apparatus to further: determine a state of the mission; and determine a parameter of the procedure that depends on the state of the mission, and wherein the apparatus caused to compose the message includes the apparatus caused to apply the parameter to a message template to thereby compose the message.

Clause 5. The apparatus of clause 4, wherein the state of the mission, and the parameter of the procedure, are determined and updated as the mission is executed.

Clause 6. The apparatus of clause 5, wherein the procedure is a lost-link procedure that is executable to cause the aircraft to land at an airport, and the parameter includes an identifier of the airport.

Clause 7. The apparatus of any of clauses 1 to 6, wherein the processing circuitry is configured to execute the computer-readable program code to cause the apparatus to further monitor traffic on the radio channel to detect a gap in the traffic on the radio channel, and wherein the corresponding verbal message is sent over the radio channel during the gap in the traffic on the radio channel.

Clause 8. The apparatus of clause 7, wherein the apparatus caused to monitor the traffic on the radio channel includes the apparatus caused to: capture verbal communications on the radio channel; apply the verbal communications to a speech-to-text engine to convert the verbal communications to corresponding messages; and perform a content analysis of the corresponding messages to identify a gap in the corresponding messages and thereby the gap in the traffic, the gap indicated by one of the corresponding messages without an expected response, or by a set of the corresponding messages that reflect a complete message exchange.

Clause 9. The apparatus of any of clauses 1 to 8, wherein the processing circuitry is configured to execute the computer-readable program code to cause the apparatus to further: cause the aircraft to execute the procedure responsive to the lost-link event; and convey a status update with a corresponding verbal update message sent over the radio channel as the aircraft is caused to execute the procedure.

Clause 10. The apparatus of clause 9, wherein the processing circuitry is configured to execute the computer-readable program code to cause the apparatus to further: determine a state of the aircraft or an environment of the aircraft; and cause the aircraft to deviate from the procedure based on the state of the aircraft or the environment, and wherein the apparatus caused to convey the status update includes the apparatus caused to convey deviation from the procedure.

Clause 11. The apparatus of clause 9 or clause 10, wherein the apparatus caused to convey the status update includes the apparatus caused to: compose an update message that indicates the status update of the aircraft with regard to execution of the procedure; apply the update message to the text-to-speech engine to convert the update message to the corresponding verbal update message in which the status update is conveyed; and send the corresponding verbal update message over the radio channel.

Clause 12. The apparatus of clause 11, wherein the processing circuitry is configured to execute the computer-readable program code to cause the apparatus to further: determine a state of the procedure; and determine a parameter of the procedure that depends on the state of the procedure, and wherein the apparatus caused to compose the update message includes the apparatus caused to apply the parameter to a message template to thereby compose the update message.

Clause 13. The apparatus of clause 11 or clause 12, wherein the processing circuitry is configured to execute the computer-readable program code to cause the apparatus to further monitor traffic on the radio channel to detect a gap in the traffic on the radio channel, and wherein the corresponding verbal update message is sent over the radio channel during the gap in the traffic on the radio channel.

Clause 14. The apparatus of clause 13, wherein the apparatus caused to monitor the traffic on the radio channel includes the apparatus caused to: capture verbal communications on the radio channel; apply the verbal communications to a speech-to-text engine to convert the verbal communications to corresponding messages; and perform a content analysis of the corresponding messages to identify a gap in the corresponding messages and thereby the gap in the traffic, the gap indicated by one of the corresponding messages without an expected response, or by a set of the corresponding messages that reflect a complete message exchange.

Clause 15. A method of supporting an aircraft to execute a mission in which the aircraft maneuvers in an airspace system, the method comprising: detecting a lost-link event in which a datalink between the aircraft and a control station is interrupted or lost, and responsive to which the aircraft is preconfigured to execute a procedure; and conveying an intent of the aircraft to execute the procedure over a radio channel assigned for voice communication in the airspace system, conveying the intent including: composing a message that indicates the intent of the aircraft to execute the procedure; applying the message to a text-to-speech engine to convert the message to a corresponding verbal message in which the intent of the aircraft is conveyed; and sending the corresponding verbal message over the radio channel assigned for voice communication in the airspace system.

Clause 16. The method of clause 15, wherein the datalink is a command and control (C2) link between the aircraft and the ground station.

Clause 17. The method of clause 15 or clause 16, wherein the procedure is a lost-link procedure that is executable to cause the aircraft to land at an airport.

Clause 18. The method of any of clauses 15 to 17, wherein the method further comprises: determining a state of the mission; and determining a parameter of the procedure that depends on the state of the mission, and wherein composing the message includes applying the parameter to a message template to thereby compose the message.

Clause 19. The method of clause 18, wherein the state of the mission, and the parameter of the procedure, are determined and updated as the mission is executed.

Clause 20. The method of clause 19, wherein the procedure is a lost-link procedure that is executable to cause the aircraft to land at an airport, and the parameter includes an identifier of the airport.

Clause 21. The method of any of clauses 15 to 20, wherein the method further comprises monitoring traffic on the radio channel to detect a gap in the traffic on the radio channel, and wherein the corresponding verbal message is sent over the radio channel during the gap in the traffic on the radio channel.

Clause 22. The method of clause 21, wherein monitoring the traffic on the radio channel includes: capturing verbal communications on the radio channel; applying the verbal communications to a speech-to-text engine to convert the verbal communications to corresponding messages; and performing a content analysis of the corresponding messages to identify a gap in the corresponding messages and thereby the gap in the traffic, the gap indicated by one of the corresponding messages without an expected response, or by a set of the corresponding messages that reflect a complete message exchange.

Clause 23. The method of any of clauses 15 to 22, wherein the method further comprises: causing the aircraft to execute the procedure responsive to the lost-link event; and conveying a status update with a corresponding verbal update message sent over the radio channel as the aircraft is caused to execute the procedure.

Clause 24. The method of clause 23, wherein the method further comprises: determining a state of the aircraft or an environment of the aircraft; and causing the aircraft to deviate from the procedure based on the state of the aircraft or the environment, and wherein conveying the status update includes conveying deviation from the procedure.

Clause 25. The method of clause 23 or clause 24, wherein conveying the status update includes: composing an update message that indicates the status update of the aircraft with regard to execution of the procedure; applying the update message to the text-to-speech engine to convert the update message to the corresponding verbal update message in which the status update is conveyed; and sending the corresponding verbal update message over the radio channel.

Clause 26. The method of clause 25, wherein the method further comprises: determining a state of the procedure; and determining a parameter of the procedure that depends on the state of the procedure, and wherein composing the update message includes applying the parameter to a message template to thereby compose the update message.

Clause 27. The method of clause 25 or clause 26, wherein the method further comprises monitoring traffic on the radio channel to detect a gap in the traffic on the radio channel, and wherein the corresponding verbal update message is sent over the radio channel during the gap in the traffic on the radio channel.

Clause 28. The method of clause 27, wherein monitoring the traffic on the radio channel includes: capturing verbal communications on the radio channel; applying the verbal communications to a speech-to-text engine to convert the verbal communications to corresponding messages; and performing a content analysis of the corresponding messages to identify a gap in the corresponding messages and thereby the gap in the traffic, the gap indicated by one of the corresponding messages without an expected response, or by a set of the corresponding messages that reflect a complete message exchange.

Clause 29. A computer-readable storage medium for supporting an aircraft to execute a mission in which the aircraft maneuvers in an airspace system, the computer-readable storage medium being non-transitory and having computer-readable program code stored therein that, in response to execution by processing circuitry, causes an apparatus to at least: detect a lost-link event in which a datalink between the aircraft and a control station is interrupted or lost, and responsive to which the aircraft is preconfigured to execute a procedure; and convey an intent of the aircraft to execute the procedure over a radio channel assigned for voice communication in the airspace system, including the apparatus caused to: compose a message that indicates the intent of the aircraft to execute the procedure; apply the message to a text-to-speech engine to convert the message to a corresponding verbal message in which the intent of the aircraft is conveyed; and send the corresponding verbal message over the radio channel assigned for voice communication in the airspace system.

Clause 30. The computer-readable storage medium of clause 29, wherein the datalink is a command and control (C2) link between the aircraft and the ground station.

Clause 31. The computer-readable storage medium of clause 29 or clause 30, wherein the procedure is a lost-link procedure that is executable to cause the aircraft to land at an airport.

Clause 32. The computer-readable storage medium of any of clauses 29 to 31, wherein the computer-readable storage medium has further computer-readable program code stored therein that, in response to execution by the processing circuitry, causes the apparatus to further: determine a state of the mission; and determine a parameter of the procedure that depends on the state of the mission, and wherein the apparatus caused to compose the message includes the apparatus caused to apply the parameter to a message template to thereby compose the message.

Clause 33. The computer-readable storage medium of clause 32, wherein the state of the mission, and the parameter of the procedure, are determined and updated as the mission is executed.

Clause 34. The computer-readable storage medium of clause 33, wherein the procedure is a lost-link procedure that is executable to cause the aircraft to land at an airport, and the parameter includes an identifier of the airport.

Clause 35. The computer-readable storage medium of any of clauses 29 to 34, wherein the computer-readable storage medium has further computer-readable program code stored therein that, in response to execution by the processing circuitry, causes the apparatus to further monitor traffic on the radio channel to detect a gap in the traffic on the radio channel, and wherein the corresponding verbal message is sent over the radio channel during the gap in the traffic on the radio channel.

Clause 36. The computer-readable storage medium of clause 35, wherein the apparatus caused to monitor the traffic on the radio channel includes the apparatus caused to: capture verbal communications on the radio channel; apply the verbal communications to a speech-to-text engine to convert the verbal communications to corresponding messages; and perform a content analysis of the corresponding messages to identify a gap in the corresponding messages and thereby the gap in the traffic, the gap indicated by one of the corresponding messages without an expected response, or by a set of the corresponding messages that reflect a complete message exchange.

Clause 37. The computer-readable storage medium of any of clauses 29 to 36, wherein the computer-readable storage medium has further computer-readable program code stored therein that, in response to execution by the processing circuitry, causes the apparatus to further: cause the aircraft to execute the procedure responsive to the lost-link event; and convey a status update with a corresponding verbal update message sent over the radio channel as the aircraft is caused to execute the procedure.

Clause 38. The computer-readable storage medium of clause 37, wherein the computer-readable storage medium has further computer-readable program code stored therein that, in response to execution by the processing circuitry, causes the apparatus to further: determine a state of the aircraft or an environment of the aircraft; and cause the aircraft to deviate from the procedure based on the state of the aircraft: or the environment, and wherein the apparatus caused to convey the status update includes the apparatus caused to convey deviation from the procedure.

Clause 39. The computer-readable storage medium of clause 37 or clause 38, wherein the apparatus caused to convey the status update includes the apparatus caused to: compose an update message that indicates the status update of the aircraft with regard to execution of the procedure; apply the update message to the text-to-speech engine to convert the update message to the corresponding verbal update message in which the status update is conveyed; and send the corresponding verbal update message over the radio channel.

Clause 40. The computer-readable storage medium of clause 39, wherein the computer-readable storage medium has further computer-readable program code stored therein that, in response to execution by the processing circuitry, causes the apparatus to further: determine a state of the procedure; and determine a parameter of the procedure that depends on the state of the procedure, and wherein the apparatus caused to compose the update message includes the apparatus caused to apply the parameter to a message template to thereby compose the update message.

Clause 41. The computer-readable storage medium of clause 39 or clause 40, wherein the computer-readable storage medium has further computer-readable program code stored therein that, in response to execution by the processing circuitry, causes the apparatus to further monitor traffic on the radio channel to detect a gap in the traffic on the radio channel, and wherein the corresponding verbal update message is sent over the radio channel during the gap in the traffic on the radio channel.

Clause 42. The computer-readable storage medium of clause 41, wherein the apparatus caused to monitor the traffic on the radio channel includes the apparatus caused to: capture verbal communications on the radio channel; apply the verbal communications to a speech-to-text engine to convert the verbal communications to corresponding messages; and perform a content analysis of the corresponding messages to identify a gap in the corresponding messages and thereby the gap in the traffic, the gap indicated by one of the corresponding messages without an expected response, or by a set of the corresponding messages that reflect a complete message exchange.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for supporting an aircraft to execute a mission in which the aircraft maneuvers in an airspace system, the apparatus comprising:
    a memory configured to store computer-readable program code; and
    processing circuitry configured to access the memory, and execute the computer-readable program code to cause the apparatus to at least:
    detect a lost-link event in which a datalink between the aircraft and a control station is interrupted or lost, and responsive to which the aircraft is preconfigured to execute a procedure; and
    convey an intent of the aircraft to execute the procedure over a radio channel assigned for voice communication in the airspace system, conveying the intent including:
        compose a message that indicates the intent of the aircraft to execute the procedure;
        apply the message to a text-to-speech engine to convert the message to a corresponding verbal message in which the intent of the aircraft is conveyed;
        monitor traffic on the radio channel to detect a gap in the traffic on the radio channel; and
        send the corresponding verbal message over the radio channel assigned for voice communication in the airspace system during the gap in the traffic on the radio channel.

2. The apparatus of claim 1, wherein the processing circuitry is configured to execute the computer-readable program code to cause the apparatus to further at least:
    determine a state of the mission; and
    determine a parameter of the procedure that depends on the state of the mission, and
    wherein the apparatus caused to compose the message includes the apparatus caused to apply the parameter to a message template to thereby compose the message.

3. The apparatus of claim 2, wherein the state of the mission, and the parameter of the procedure, are determined and updated as the mission is executed.

4. The apparatus of claim 3, wherein the procedure is a lost-link procedure that is executable to cause the aircraft to land at an airport, and the parameter includes an identifier of the airport.

5. The apparatus of claim 1, wherein the apparatus caused to monitor the traffic on the radio channel includes the apparatus caused to:
    capture verbal communications on the radio channel;
    apply the verbal communications to a speech-to-text engine to convert the verbal communications to corresponding messages; and
    perform a content analysis of the corresponding messages to identify a gap in the corresponding messages and thereby the gap in the traffic, the gap indicated by one of the corresponding messages without an expected response, or by a set of the corresponding messages that reflect a complete message exchange.

6. The apparatus of claim 1, wherein the processing circuitry is configured to execute the computer-readable program code to cause the apparatus to further at least:
    cause the aircraft to execute the procedure responsive to the lost-link event; and
    convey a status update with a corresponding verbal update message sent over the radio channel as the aircraft is caused to execute the procedure.

7. The apparatus of claim 5, wherein the processing circuitry is configured to execute the computer-readable program code to cause the apparatus to further at least:
    determine a state of the aircraft or an environment of the aircraft; and
    cause the aircraft to deviate from the procedure based on the state of the aircraft or the environment, and
    wherein the apparatus caused to convey the status update includes the apparatus caused to convey deviation from the procedure.

8. The apparatus of claim 6, wherein the apparatus caused to convey the status update includes the apparatus caused to:
    compose an update message that indicates the status update of the aircraft with regard to execution of the procedure;
    apply the update message to the text-to-speech engine to convert the update message to the corresponding verbal update message in which the status update is conveyed; and
    send the corresponding verbal update message over the radio channel.

9. The apparatus of claim 8, wherein the processing circuitry is configured to execute the computer-readable program code to cause the apparatus to further at least:
    determine a state of the procedure; and
    determine a parameter of the procedure that depends on the state of the procedure, and
    wherein the apparatus caused to compose the update message includes the apparatus caused to apply the parameter to a message template to thereby compose the update message.

10. The apparatus of claim 8,
    wherein the corresponding verbal update message is sent over the radio channel during the gap in the traffic on the radio channel.

11. The apparatus of claim 10, wherein the apparatus caused to monitor the traffic on the radio channel includes the apparatus caused to:
    capture verbal communications on the radio channel;

apply the verbal communications to a speech-to-text engine to convert the verbal communications to corresponding messages; and perform a content analysis of the corresponding messages to identify a gap in the corresponding messages and thereby the gap in the traffic, the gap indicated by one of the corresponding messages without an expected response, or by a set of the corresponding messages that reflect a complete message exchange.

12. A method of supporting an aircraft to execute a mission in which the aircraft maneuvers in an airspace system, the method comprising:

detecting a lost-link event in which a datalink between the aircraft and a control station is interrupted or lost, and responsive to which the aircraft is preconfigured to execute a procedure; and conveying an intent of the aircraft to execute the procedure over a radio channel assigned for voice communication in the airspace system, conveying the intent including:

composing a message that indicates the intent of the aircraft to execute the procedure;

applying the message to a text-to-speech engine to convert the message to a corresponding verbal message in which the intent of the aircraft is conveyed;

monitoring traffic on the radio channel to detect a gap in the traffic on the radio channel; and sending the corresponding verbal message over the radio channel assigned for voice communication in the airspace system during the gap in the traffic on the radio channel.

13. The method of claim 12, wherein the method further comprises:

determining a state of the mission; and determining a parameter of the procedure that depends on the state of the mission, and wherein composing the message includes applying the parameter to a message template to thereby compose the message.

14. The method of claim 13, wherein the state of the mission, and the parameter of the procedure, are determined and updated as the mission is executed.

15. The method of claim 14, wherein the procedure is a lost-link procedure that is executable to cause the aircraft to land at an airport, and the parameter includes an identifier of the airport.

16. The method of claim 12, wherein monitoring the traffic on the radio channel includes:

capturing verbal communications on the radio channel;

applying the verbal communications to a speech-to-text engine to convert the verbal communications to corresponding messages; and performing a content analysis of the corresponding messages to identify a gap in the corresponding messages and thereby the gap in the traffic, the gap indicated by one of the corresponding messages without an expected response, or by a set of the corresponding messages that reflect a complete message exchange.

17. The method of claim 12, wherein the method further comprises:

causing the aircraft to execute the procedure responsive to the lost-link event; and conveying a status update with a corresponding verbal update message sent over the radio channel as the aircraft is caused to execute the procedure.

18. The method of claim 17, wherein the method further comprises:

determining a state of the aircraft or an environment of the aircraft; and causing the aircraft to deviate from the procedure based on the state of the aircraft or the environment, and wherein conveying the status update includes conveying deviation from the procedure.

19. The method of claim 17, wherein conveying the status update includes:

composing an update message that indicates the status update of the aircraft with regard to execution of the procedure;

applying the update message to the text-to-speech engine to convert the update message to the corresponding verbal update message in which the status update is conveyed; and sending the corresponding verbal update message over the radio channel.

20. The method of claim 19, wherein the method further comprises:

determining a state of the procedure; and determining a parameter of the procedure that depends on the state of the procedure, and wherein composing the update message includes applying the parameter to a message template to thereby compose the update message.

21. The method of claim 19, wherein the corresponding verbal update message is sent over the radio channel during the gap in the traffic on the radio channel.

22. The method of claim 21, wherein monitoring the traffic on the radio channel includes:

capturing verbal communications on the radio channel;

applying the verbal communications to a speech-to-text engine to convert the verbal communications to corresponding messages; and performing a content analysis of the corresponding messages to identify a gap in the corresponding messages and thereby the gap in the traffic, the gap indicated by one of the corresponding messages without an expected response, or by a set of the corresponding messages that reflect a complete message exchange.

23. The apparatus of claim 1, wherein the processing circuitry is configured to execute the computer-readable program code to cause the apparatus to further at least:

responsive to a disruption in the airspace system, provide an air navigation service provider with an ability to modify a behavior of the aircraft during the lost-link event.

24. The method of claim 12, further comprising:

responsive to a disruption in the airspace system, providing an air navigation service provider with an ability to modify a behavior of the aircraft during the lost-link event.

* * * * *